US008437567B2

(12) United States Patent
Jeong et al.

(10) Patent No.: US 8,437,567 B2
(45) Date of Patent: May 7, 2013

(54) IMAGE INPAINTING APPARATUS AND METHOD USING RESTRICTED SEARCH REGION (75) Inventors: Young-Min Jeong, Gyeonggi-do (KR); Sung-Dae Cho, Gyeonggi-do (KR); Tae-Hwa Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 375 days.

(21) Appl. No.: 12/915,993

(22) Filed: Oct. 29, 2010

(65) Prior Publication Data

US 2011/0103706 A1 May 5, 2011

(30) Foreign Application Priority Data

Oct. 29, 2009 (KR) .................. 10-2009-0103611

(51) Int. Cl.
*G06T 5/00* (2006.01)
(52) U.S. Cl.
USPC .......... 382/254; 382/275; 358/3.26; 358/3.27
(58) Field of Classification Search .................. 382/254, 382/274, 275; 358/3.26, 3.27
See application file for complete search history.

(56) References Cited

U.S. PATENT DOCUMENTS

| 6,898,240 | B2 * | 5/2005 | Prakash et al. ........... 375/240.08 |
| 7,755,645 | B2 * | 7/2010 | Sun et al. ...................... 345/634 |
| 8,073,277 | B2 * | 12/2011 | Huan et al. .................... 382/254 |
| 8,285,070 | B2 * | 10/2012 | Panetta et al. ................. 382/266 |
| 2003/0210828 | A1 * | 11/2003 | Georgiev et al. .............. 382/254 |
| 2004/0164996 | A1 | 8/2004 | Criminisi et al. |
| 2005/0168482 | A1 * | 8/2005 | Criminisi et al. ............. 345/619 |
| 2006/0045372 | A1 * | 3/2006 | Wang et al. ................... 382/254 |
| 2008/0319723 | A1 * | 12/2008 | Smith et al. ...................... 703/2 |
| 2010/0177978 | A1 | 7/2010 | Jeong et al. |
| 2012/0179432 | A1 * | 7/2012 | Wivell et al. ...................... 703/2 |

FOREIGN PATENT DOCUMENTS

| JP | 2005-184307 | 7/2005 |
| JP | 2008-300990 | 12/2008 |
| KR | 1020100083498 | 7/2010 |

OTHER PUBLICATIONS

Wang et al.: "Edge-Based Image Completing Guided by Region Segmentation", 2008 ISECS International Colloquium on Computing, Communication, Control, and Management, Aug. 3, 2008.
Atzori et al.: "Error Concealment in Video Transmission over Packet Networks by a Sketch-based Approach", Signal Processing: Image Communication, vol. 15, Sep. 1, 1999.

(Continued)

*Primary Examiner* — Jon Chang
(74) *Attorney, Agent, or Firm* — The Farrell Law Firm, P.C.

(57) ABSTRACT

Disclosed is an image inpainting apparatus and method using a restricted search region. The image inpainting apparatus sets a target image region to be inpainted in response to an image inpainting request, sets a surrounding image region, which has a preset size and includes the set target image region, sets a plurality of similar image regions by grouping similar pixels in the surrounding image region, divides the surrounding image region into the plurality of set similar image regions, divides the target image region according to the similar image regions, sets a search region of each divided target image region, and detects an image of an image region most similar to each divided target image region from the set search region of each divided target image region, thereby performing image inpainting. Accordingly, image inpainting is performed using a search region, which has been determined to include a similar image most similar to an image to inpaint, so that it is possible to increase the probability of searching for an image most similar to the inpainting image region.

9 Claims, 9 Drawing Sheets

OTHER PUBLICATIONS

Rares et al.: "Edge-Based Image Restoration", IEEE Transactions on Image Processing, vol. 14, No. 10, Oct. 1, 2005.

Drori et al.: "Fragment-based Image Completion", ACM Transactions on Graphics, Jul. 1, 2003.

A. Criminisi et al., "Region Filling and Object Removal by Exemplar-Based Image Inpainting", IEEE Transactions on Image Processing, vol. 13, No. 9, Sep. 2004.

* cited by examiner

IMAGE INPAINTING APPARATUS AND METHOD USING RESTRICTED SEARCH REGION

PRIORITY

This application claims priority to an application entitled "Image Inpainting Apparatus and Method Using Restricted Search Region" filed in the Korean Industrial Property Office on Oct. 29, 2009 and assigned Ser. No. 10-2009-0103611, the contents of which are hereby incorporated by reference.

BACKGROUND OF THE INVENTION

1. Field of the Invention

The present invention relates generally to an image inpainting apparatus and method, and more particularly to an image inpainting apparatus and method in which a search region used in image inpainting is restricted so as to be inpainted with an image most similar to an image region to inpaint.

2. Description of the Related Art

Image inpainting is a technology that originated from restoring damaged works of art in a museum, and is currently used for various purposes, such as restoring a damaged part of a picture or photograph, or removing a part from a picture or photograph.

Such image inpainting technology interpolates pixels of a background image region around a boundary part of a target image to be inpainted when there is the target image, and to fill the region of the target image with the interpolated pixels. Here, the background image represents a remaining image, except for the target image to be inpainted in the original image.

However, a resultant image generated using image inpainting technology has a problem in that a large blur is caused therein.

Various technologies have been studied to compensate the image inpainting technology, and one of them is a technology entitled "Object Removal by Exemplar-Based Inpainting."

The exemplar-based inpainting searches a background image for an image most similar to a background image part adjacent to the boundary part of a target image by making reference to edges and flat regions within the original image, and to fill the region of the target image with the searched image.

Figure 1A:
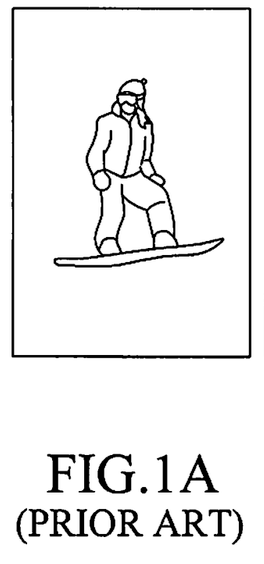
FIGS. 1A to 1C are views describing the conventional image inpainting technology.
Figure 1B:
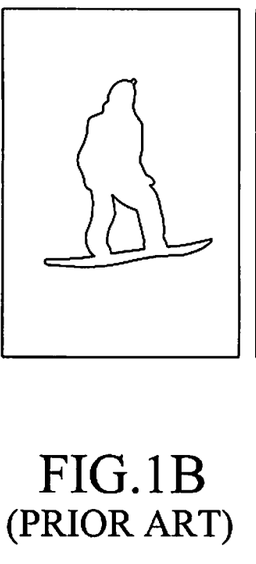
Figure 1C:
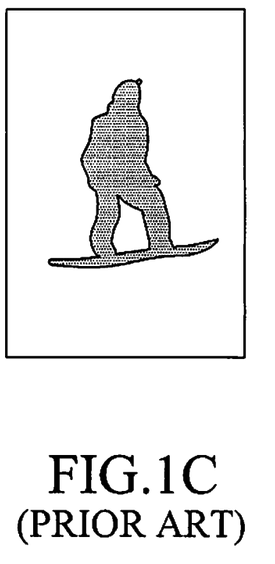

Specifically, referring to FIGS. 1A to 1C, an image inpainting apparatus using the exemplar-based inpainting technology sets a target image, as shown in FIG. 1B, within an original image as shown in FIG. 1A. Then, the image inpainting apparatus sets an inpainting image region, which includes a background image region adjacent to the boundary part of the target image and a boundary image region of the target image. Here, the inpainting image region has a preset size, and includes a portion of the target image to be inpainted.

The image inpainting apparatus searches for a similar image region, which has pixel values most similar to those in the set inpainting image region, within the background image. In this case, the pixel values in the inpainting image region represent pixel values in the background image region within the inpainting image region. Also, here, the pixel values includes red, green and blue (RGB) average values, an RGB distribution, edge values, etc. of pixels included in the image region.

Thereafter, the image inpainting apparatus copies only a similar target image, which corresponds to the target image region within the inpainting image region, from the searched similar image region, and then pastes the copied similar target image into the target image region of the inpainting image region. The image inpainting apparatus repeatedly performs the aforementioned operation until image inpainting has been completed. When image inpainting has been completed, a resultant image as shown in FIG. 1C is displayed.

As described above, the conventional image inpainting apparatus inpaints a damaged image using the exemplar-based inpainting technology. However, there is a problem in that, when the image inpainting apparatus searches for a similar image region having pixel values most similar to those in an inpainting image region, an image completely different from an image to inpaint a target image region may be searched for.

Figure 2A:
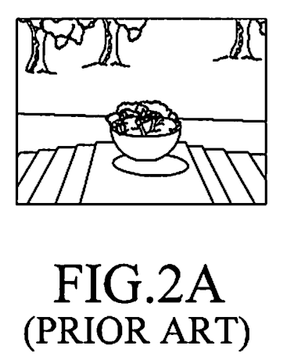
FIGS. 2A to 2D illustrate an image to which the conventional image inpainting technology is applied.
Figure 2B:
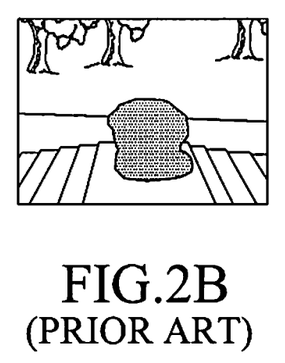
Figure 2C:
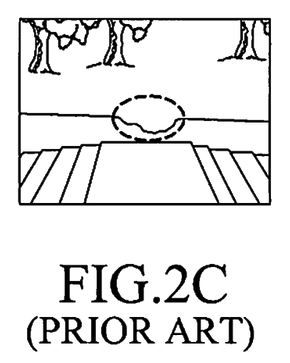
Figure 2D:
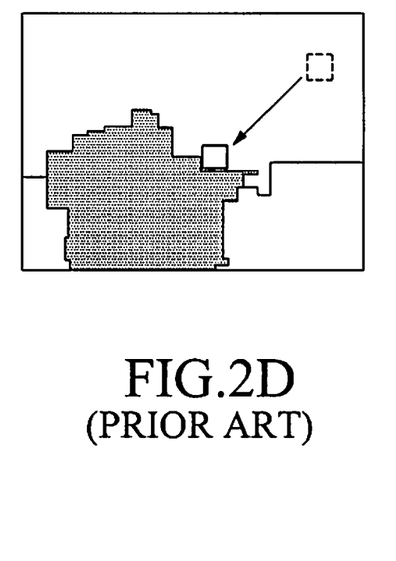

Specifically, referring to FIGS. 2A to 2D, when removing a flowerpot image, as shown in FIG. 2B, from an exemplar image as shown in FIG. 2A, and inpainting an image of a corresponding position, an image inpainting apparatus searches for the most similar portion within an inpainting image region, and performs image inpainting based on the searched portion. However, in this case, an image of a portion determined to be similar may be an image which is close in distance but is a completely different image, as shown in FIG. 2C, so that an error as shown in FIG. 2D may occur.

SUMMARY OF THE INVENTION

Accordingly, the present invention has been made to solve the above-mentioned problems occurring in the prior art, and the present invention provides an image inpainting apparatus and method for accurately inpainting an image desired by the user through the use of a search region which includes an image most similar to an image to inpaint, thereby reducing errors, which have occurred in the prior art.

In accordance with an aspect of the present invention, there is provided an image inpainting apparatus using a restricted search region, the apparatus including a target region setup unit for setting a target image region to be inpainted in response to an image inpainting request; a surrounding region setup unit for setting a surrounding image region which has a preset size and includes the set target image region; a similar region division unit for setting a plurality of similar image regions by grouping similar pixels in the set surrounding image region, and dividing the surrounding image region into the plurality of set similar image regions; a search region setup unit for dividing the target image region according to the similar image regions, and setting a search region of each divided target image region; and an inpainting processing unit for detecting an image of an image region most similar to each divided target image region from the set search region of each divided target image region, and copying and pasting the detected image into each corresponding target image region.

In accordance with another aspect of the present invention, there is provided an image inpainting method using a restricted search region, the method including: setting a target image region to be inpainted in response to an image inpainting request; setting a surrounding image region which has a preset size and includes the set target image region; setting a plurality of similar image regions by grouping similar pixels in the set surrounding image region, and dividing the surrounding image region into the plurality of set similar image regions; dividing the target image region according to the similar image regions, and setting a search region of each divided target image region; and detecting an image of an image region most similar to each divided target image region from the set search region of each divided target image region, and copying and pasting the detected image into each corresponding target image region.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, a detailed description of known functions and configurations incorporated herein will be omitted when it may make the subject matter of the present invention rather unclear.

Figure 3:
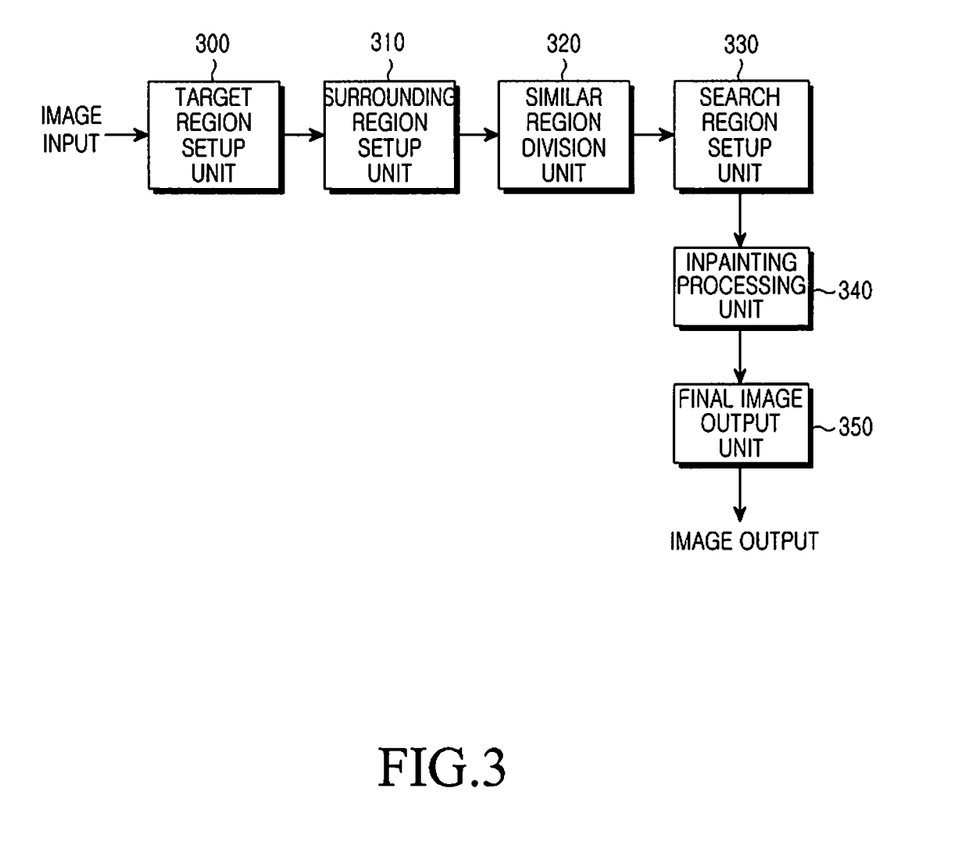
FIG. 3 is a block diagram illustrating the configuration of an image inpainting apparatus according to an embodiment of the present invention.

FIG. 3 is a block diagram illustrating the configuration of an image inpainting apparatus according to an embodiment of the present invention.

The image inpainting apparatus includes a target region setup unit 300, a surrounding region setup unit 310, a similar region division unit 320, a search region setup unit 330, an inpainting processing unit 340, and a final image output unit 350.

The target region setup unit 300 sets a target image region within an input exemplar image according to a request for setup of a target image to be removed from the exemplar image.

The surrounding region setup unit 310 sets a surrounding image region, which is adjacent to the target image region and is used for reference in image inpainting. In this case, the surrounding image region is set to a region, which has a size greater than the target image region while including the target image region.

The similar region division unit 320 groups pixels included in the set surrounding image region according to pixels similar to each other, thereby dividing the surrounding image region into at least one similar image region which is constituted with a group of similar pixels.

Specifically, the similar region division unit 320 calculates the edge value of each pixel existing in the set surrounding image region, and calculates edge difference values which are the differences between the edge values of the respective pixels. Thereafter, when confirming that there are pixels having edge difference values greater than or equal to a preset threshold value among the calculated edge difference values, the similar region division unit 320 groups pixels having edge difference values less than the threshold value into one similar image region, thereby setting one similar image region. In this case, the preset threshold value is a reference value which is preset to identify pixels, which show a large difference in the edge difference value, among the pixels included in a similar image region.

For example, when edge values are calculated starting from the first pixel in the upper left corner of the surrounding image region, the similar region division unit 320 calculates edge values of the next pixels in descending order from the first pixel in the upper left corner of the surrounding image region, and compares the edge value of each pixel with the edge value of a surrounding pixel, thereby calculating an edge difference value. When comparing the respective calculated edge difference values with a preset threshold value and determining that there are pixels having an edge difference value greater than or equal to the threshold value, the similar region division unit 320 groups only pixels having edge difference values less than the threshold value among the pixels included in the surrounding image region, thereby setting the grouped pixels to one similar image region.

In addition, the similar region division unit 320 calculates edge values of the next pixels in ascending order from the first pixel in the lower left corner with respect to a remaining region of the surrounding image region, except for the set similar image region, and compares the edge value of each pixel with the edge value of a surrounding pixel, thereby calculating an edge difference value. When comparing the respective calculated edge difference values with a preset threshold value and determining that there are pixels having an edge difference value greater than or equal to the threshold value, the similar region division unit 320 groups only pixels having edge difference values less than the threshold value among the pixels included in the remaining image region, thereby setting the grouped pixels to another similar image region. In such a manner, a plurality of similar image regions may be set.

When two similar image regions are set in the surrounding image region, the similar region division unit 320 divides the surrounding image region into the two set similar image regions. Although this embodiment has been described for the case where the surrounding image region is divided into two similar image regions, a surrounding image region may be divided into three or more similar image regions.

The search region setup unit 330 divides the target image region into a plurality of inpainting image regions for inpainting through the use of the divided similar image regions, and sets the respective similar image regions as a search region used to inpaint the inpainting image regions.

This embodiment will be described for the case where the surrounding image region is divided into two similar image regions, i.e. into a first similar image region and a second similar image region.

Specifically, the search region setup unit 330 searches for pixels corresponding to a position at which the first similar image region, the second similar image region, and the target image region meet each other.

Then, the search region setup unit 330 estimates division regions based on the searched pixels, and divides the target image region into the estimated division regions. The search region setup unit 330 sets a target image region near the first similar image region, among the divided target image regions, as a first inpainting image region, and sets a target image region near the second similar image region as a second inpainting image region.

Thereafter, the search region setup unit 330 sets the first similar image region as a first search region used to inpaint the first inpainting image region, and the second similar image region as a second search region used to inpaint the second inpainting image region.

The inpainting processing unit 340 inpaints the respective inpainting image regions using the set search regions.

Specifically, the inpainting processing unit 340 searches the first search region for a similar search region which is most similar to a background image of a specific inpainting image region within the first inpainting image region, and detects an image corresponding to the specific inpainting image region from the searched similar search region. Thereafter, the inpainting processing unit 340 copies the detected image to the specific inpainting image region, and such an inpainting operation is continuously performed until the first inpainting image region is fully inpainted.

Also, the inpainting processing unit 340 searches the second search region for a similar search region which is most similar to a background image of a specific inpainting image region within the second inpainting image region, and detects an image corresponding to the specific inpainting image region from the searched similar search region. Thereafter, the inpainting processing unit 340 copies the detected image to the specific inpainting image region, and such an inpainting operation is continuously performed until the second inpainting image region is fully inpainted.

The final image output unit 350 displays a final image obtained when the inpainting has been completed, on a screen.

As described above, according to an embodiment of the present invention, a similar image is searched for only within a search region, which is determined to include an image most similar to an inpainting image region, so that it is possible to increase the probability of searching for an image most similar to the inpainting image region.

Hereinafter, according to an embodiment of the present invention, an image inpainting procedure performed by the image inpainting apparatus having a configuration as shown in FIG. 3 will now be described in detail with reference to FIGS. 4A, 4B, and 5.

Figure 4A:
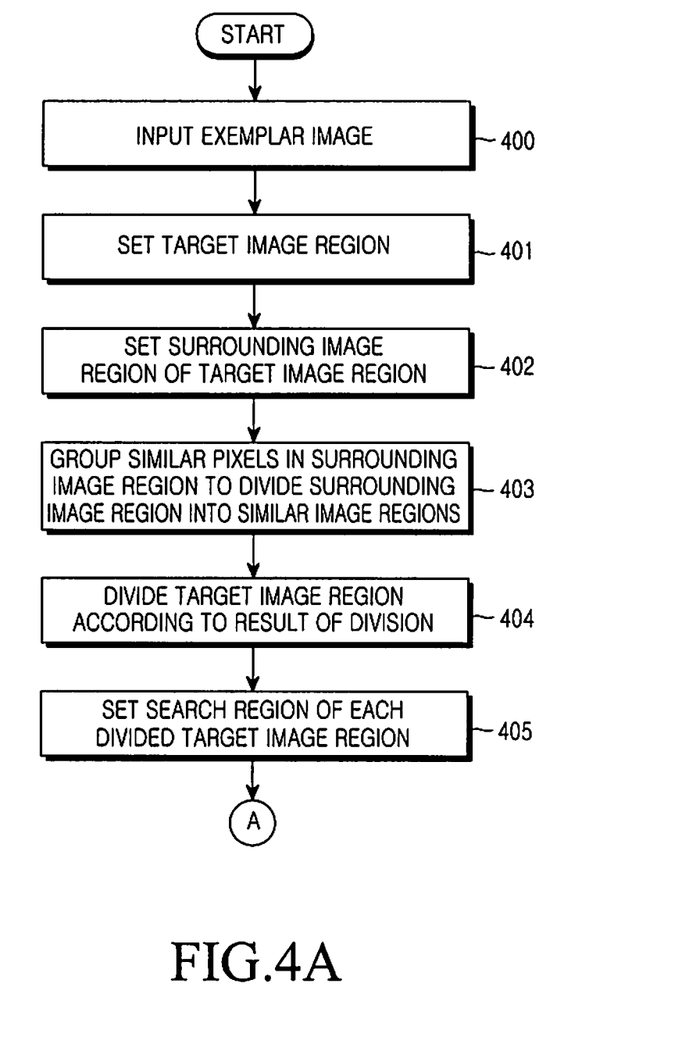
FIG. 4A is a flowchart illustrating a procedure of setting a search region used for an image inpainting apparatus to perform image inpainting according to each inpainting image region according to an embodiment of the present invention.
Figure 4B:
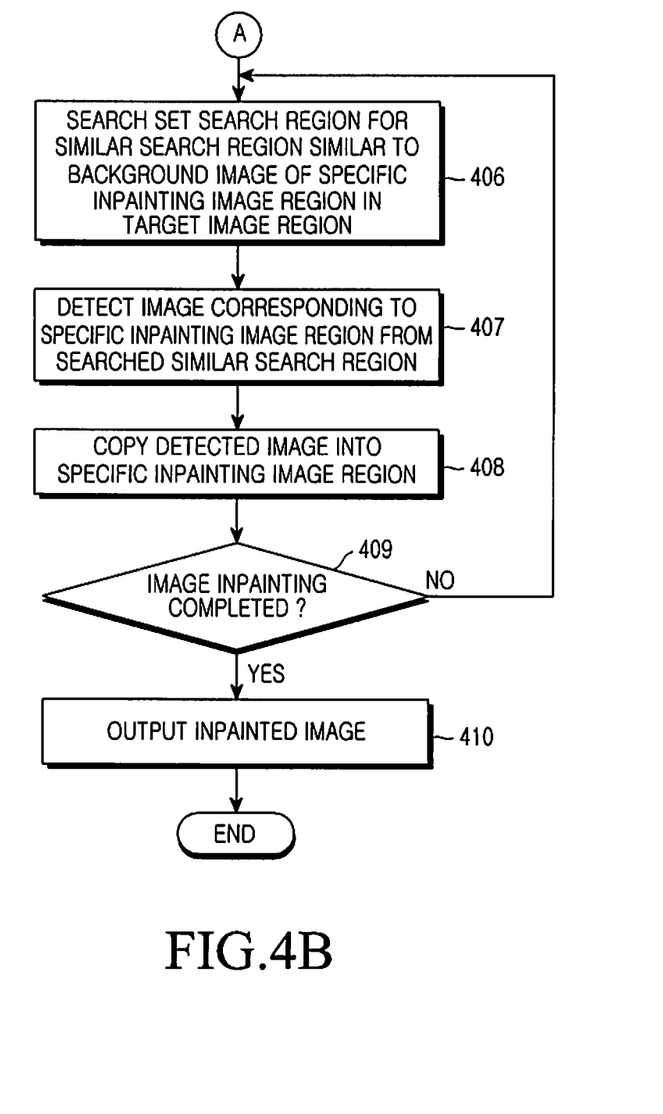
FIG. 4B is a flowchart illustrating a procedure of inpainting an image through the use of a set search region according to an embodiment of the present invention.

FIG. 4A is a flowchart illustrating a procedure of setting a search region used for the image inpainting apparatus to perform image inpainting according to each inpainting image region according to an embodiment of the present invention, and FIG. 4B is a flowchart illustrating a procedure of inpainting an image through the use of a set search region according to an embodiment of the present invention.

Referring to FIG. 4A, when the target region setup unit 300 receives an exemplar image in step 400, the target region setup unit 300 sets a target image region to be inpainted within the exemplar image in step 401.

FIGS. 5A to 5F are views describing a procedure of inpainting an image in the image inpainting apparatus according to an embodiment of the present invention.

Figure 5A:
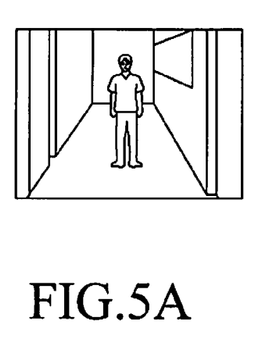
FIGS. 5A to 5F are views describing a procedure of inpainting an image in an image inpainting apparatus according to an embodiment of the present invention.
Figure 5B:
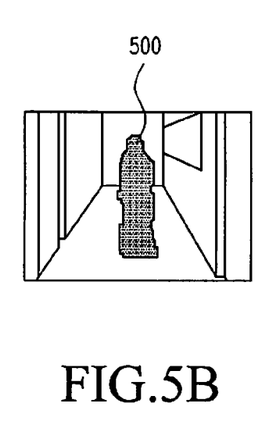

Referring to FIGS. 5A to 5F, when receiving an exemplar image as shown in FIG. 5A and receiving a request to remove a person's image from the exemplar image in FIG. 5A, the target region setup unit 300 sets a target image region, as indicated by a reference number 500 in FIG. 5B.

Figure 5C:
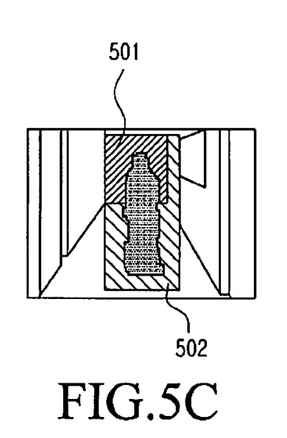
Figure 5D:
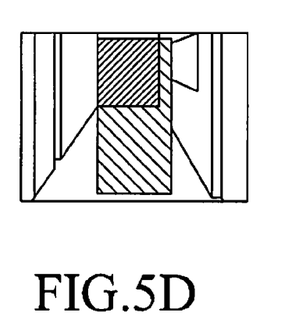

In step 402, the surrounding region setup unit 310 sets a surrounding image region, which includes the target image region and has a preset size, wherein the surrounding image region may be set to a rectangular image region including the target image region indicated by the reference number 500, as shown in FIG. 5C.

In step 403, the similar region division unit 320 groups pixels included in the surrounding image region according to pixels similar to each other, as shown in FIG. 5C, thereby dividing the surrounding image region into a plurality of similar image regions. Specifically, the similar region division unit 320 may calculate edge difference values which are differences between edge values of the respective pixels constituting the surrounding image region, and divide the similar image region, with a boundary defined by pixels which have edge difference values greater than or equal to a preset threshold value among the calculated edge difference values. In this case, a plurality of similar image regions as indicated by reference numbers 501 and 502 in FIG. 5C may be obtained by the division.

Step 403 will now be described in detail with reference to FIG. 6 and FIGS. 7A to 7C.

Figure 6:
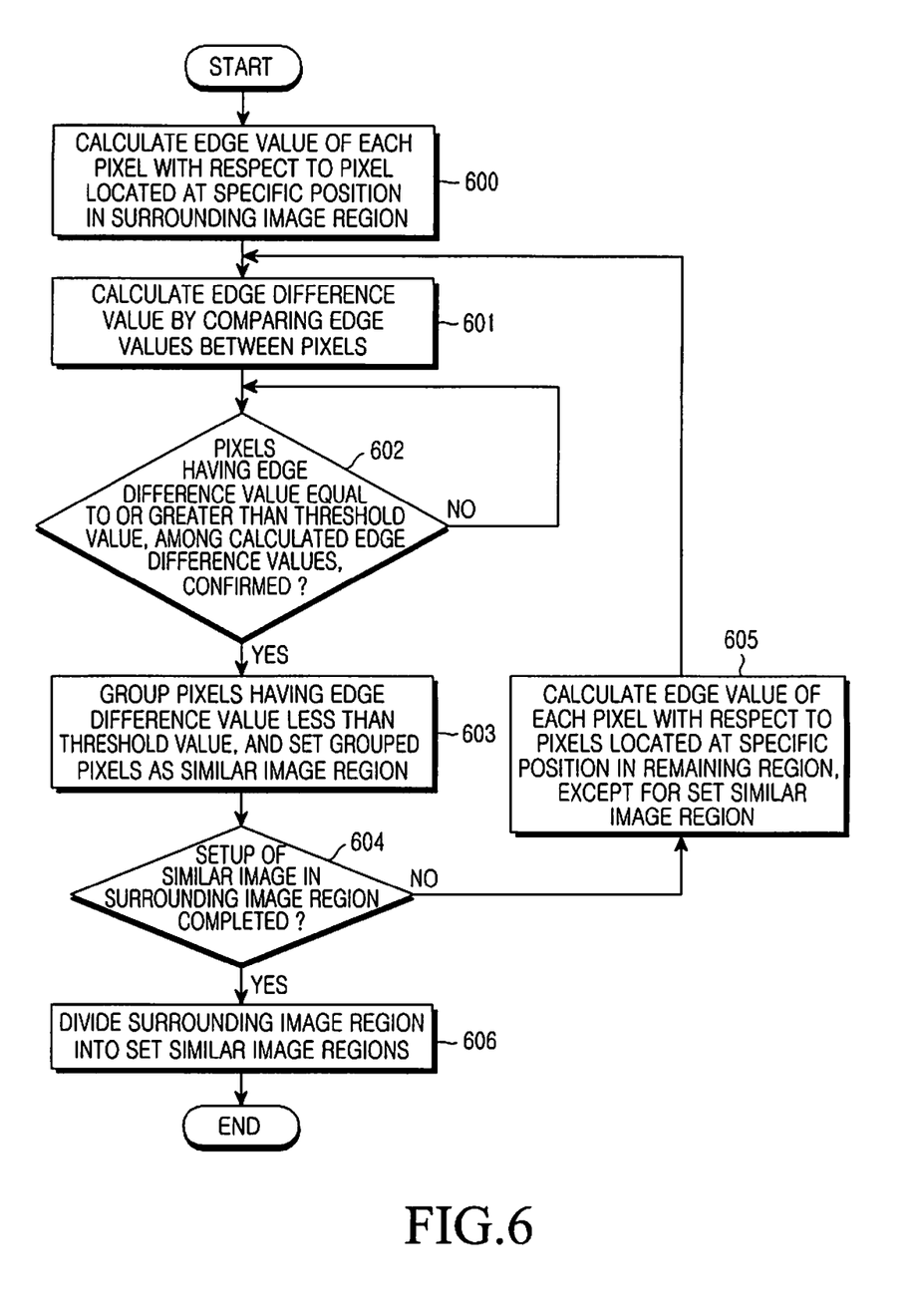
FIG. 6 is a flowchart illustrating a procedure of dividing a surrounding image region into a plurality of similar image regions in a similar region division unit according to an embodiment of the present invention.

FIG. 6 is a flowchart illustrating a procedure of dividing a surrounding image region into a plurality of similar image regions in the similar region division unit according to an embodiment of the present invention.

Figure 7A:
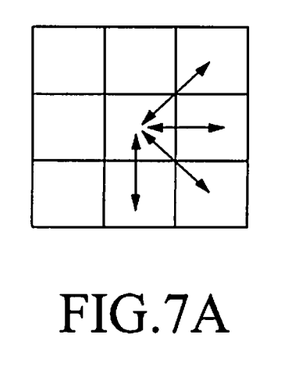
FIGS. 7A to 7C illustrate a procedure of dividing a similar image region and a surrounding image region according to an embodiment of the present invention.

Referring to FIG. 6, the similar region division unit 320 calculates the edge value of each pixel, starting from a pixel in a specific position within a surrounding image region in step 600. For example, when the similar region division unit 320 calculates edge values in descending order, the calculated edge values may have directions as shown in FIG. 7A.

In step 601, the similar region division unit 320 compares the calculated edge values between the respective pixels, and calculates edge difference values.

In step 602, the similar region division unit 320 determines if there are pixels having an edge difference value greater than or equal to a preset threshold value among the calculated edge difference values. If it is determined that there are pixels having an edge difference value greater than or equal to the preset threshold value, the similar region division unit 320 proceeds to step 603, and if not, the similar region division unit 320 repeats step 602 of determining if there are pixels having edge difference values greater than or equal to the preset threshold value.

In step 603, the similar region division unit 320 groups pixels having edge difference values less than the threshold value, which have been confirmed before the pixels having edge difference values greater than or equal to the threshold value, into one group, thereby setting one similar image region. For example, the similar region division unit 320 calculates each edge value in descending order from the first pixel located in the upper left corner of the surrounding image region, and calculates an edge difference value between the calculated edge value and the edge value of each pixel adjacent to a corresponding pixel. In the course of calculating edge difference values, when it is confirmed that there are pixels having an edge difference value greater than or equal to the threshold value, the similar region division unit 320 groups pixels having edge difference values less than the threshold value, which have been confirmed before the pixels having edge difference values greater than or equal to the threshold value, into one group, thereby setting one similar image region.

In step 604, the similar region division unit 320 determines if the similar image region setup within the surrounding image region has been completed. If the similar image region setup within the surrounding image region has been completed, the similar region division unit 320 proceeds to step 606, and if not, the similar region division unit 320 proceeds to step 605. In step 605, the similar region division unit 320 calculates the edge value of each pixel, starting from a pixel in a specific position within a remaining region of the surrounding image region, except for one or more set similar image regions, and returns to step 601 so as to repeat steps 601 to 604. For example, the similar region division unit 320 calculates each edge value in ascending order from the first pixel located in the lower left corner of the surrounding image region, and calculates an edge difference value between the calculated edge value and the edge value of each pixel adjacent to a corresponding pixel. In the course of calculating edge difference values, when it is confirmed that there are pixels having an edge difference value greater than or equal to the threshold value, the similar region division unit 320 groups pixels having edge difference values less than the threshold value, which have been confirmed before the pixels having edge difference values greater than or equal to the threshold value, into one group, thereby setting another similar image region.

In step 606, the similar region division unit 320 divides the surrounding image region into the plurality of set similar image regions. The surrounding image region may be divided into similar image regions as indicated by reference numbers 501 and 502.

Steps following step 403 will now be described again with reference to FIG. 4A.

In step 404, the search region setup unit 330 divides the target image region according to a result of the division of the surrounding image region.

Step 404 will now be described in detail with reference to FIGS. 7B and 7C.

Figure 7B:
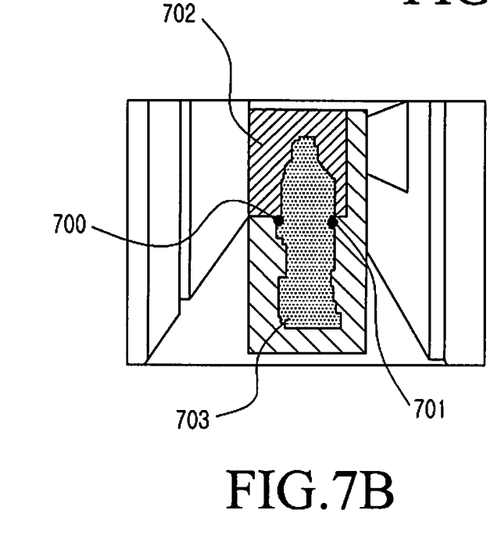

After dividing the surrounding image region into a plurality of similar image regions, the search region setup unit 330 searches for pixels, such as pixels indicated by reference numbers 700 and 701 in FIG. 7B, which are located in a position at which the plurality of similar image regions and the target image region meet each other, estimates division regions based on the searched pixels, and then divides the target image region into the estimated division regions. For example, the search region setup unit 330 may estimate that the target image region is divided into division regions with respect to a straight line connecting the searched pixels 700 and 701 to each other, and divide the target image region into two target image regions 702 and 703, as shown in FIG. 7B, according to the result of the estimation.

Figure 7C:
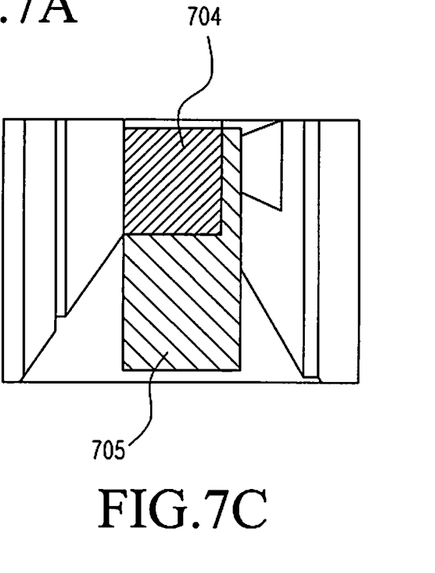

In step 405, the search region setup unit 330 sets a search region of each divided target image region, wherein the search region setup unit 330 sets a similar image region 704 adjacent to the target image region 702 as a search region of the target image region 702, within the divided target image regions as shown in FIGS. 107B and 7C. In addition, the search region setup unit 330 sets a similar image region 705 adjacent to the target image region 703 as a search region of the target image region 703. The search regions as described above may be set as shown in FIG. 5D.

After step 405, the procedure proceeds to step 406 in FIG. 4B.

Referring to FIG. 4B, when the procedure proceeds to step 406, the inpainting processing unit 340 searches a set search region for a similar search region similar to the background image of a specific inpainting image region in a target image region. In other words, the inpainting processing unit 340 selects a specific inpainting image region to be inpainted within a target image region, as indicated by a reference number 702, and searches a search region, as indicated by a reference number 704, for a similar search region similar to the background image of the selected specific image region.

When a similar search region has been searched for, the inpainting processing unit 340 detects an image corresponding to a specific inpainting image region from the searched similar search region in step 407. That is, the inpainting processing unit 340 detects an image which is most similar to the specific inpainting image region, from the similar search region.

In step 408, the inpainting processing unit 340 copies and pastes the detected image into the specific inpainting image region to be inpainted.

In step 409, the inpainting processing unit 340 determines if the image inpainting operation has been completed.

When the image inpainting operation has not been completed, the inpainting processing unit 340 returns to step 406, where the inpainting processing unit 340 searches for a similar search region, and then performs steps 407 to 409.

Figure 5E:
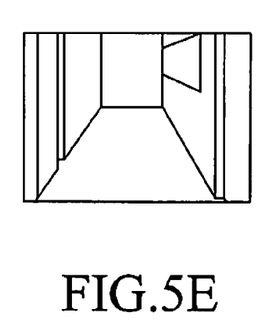

In contrast, when it is determined that the image inpainting operation has been completed in step 409, the final image output unit 350 outputs an inpainted image in step 410, as described above. In this case, an inpainted image as shown in FIG. 5E may be output.

Figure 5F:
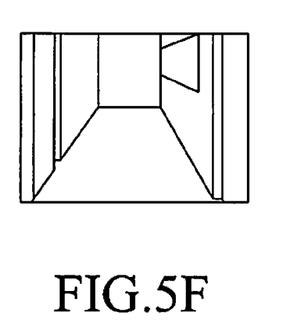

When the conventional image inpainting operation is performed, an image including an error is output, as shown in FIG. 5F. However, according to an embodiment of the present invention, an image inpainting operation is performed using a search region restricted to a search region including an image most similar to an image to inpaint, so that it is possible to output an image as shown in FIG. 5E.

Figure 8A:
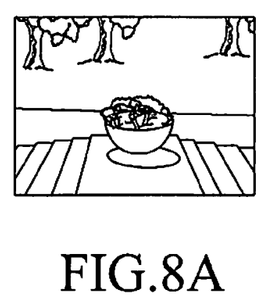
FIGS. 8A to 8F illustrate images inpainted according to an embodiment of the present invention, in comparison with images inpainted by the conventional technology, when an exemplar image is inpainted.
Figure 8B:
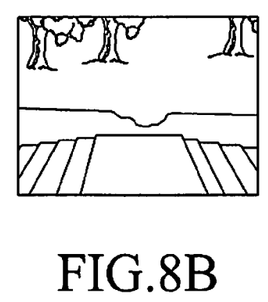
Figure 8C:
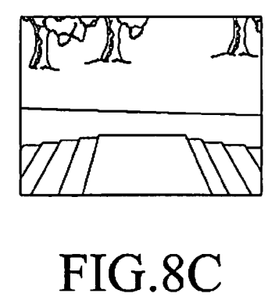
Figure 8D:
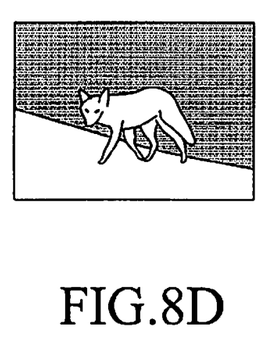
Figure 8E:
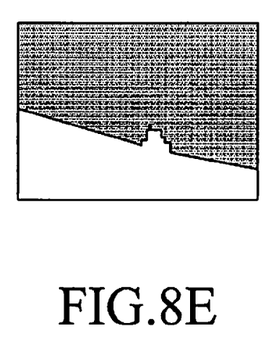
Figure 8F:
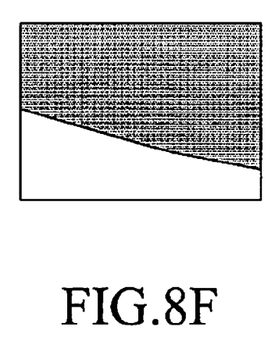

For example, upon inpainting an exemplar image as shown in FIG. 8A or 8D, the conventional image inpainting operation causes an error, as shown in FIG. 8B or 8E, but the image inpainting operation according to the present invention outputs an inpainted image as shown in FIG. 8C or 8F, respectively.

As described above, according to an embodiment of the present invention, a search region used in image inpainting is restricted to a region which is determined to include an image most similar to an image to inpaint, and a similar image is searched for only within the restricted search region, so that it is possible to increase the probability of searching for an image most similar to an inpainting image region.

The image inpainting apparatus and method according to the present invention may be implemented by hardware, software (i.e. a program), or a combination of both. Such a program may be stored in a volatile or nonvolatile recording medium, which can be read by a machine, such as a computer. The recording medium includes a storage device, such as a ROM and the like, a memory, such as a RAM, a memory chip, an integrated circuit, and the like, and an optical or magnetic recording medium, such as a CD, a DVD, a magnetic disk, a magnetic tape, and the like. That is, the image inpainting apparatus and method according to an embodiment of the present invention may be implemented in the form of a program, which includes codes for achieving the apparatus and method. Further, such a program may be transferred electrically through a medium, just as a communication signal propagated by wire or wirelessly, the equivalents of which are also included in the scope of the present invention.

According to an embodiment of the present invention, upon image inpainting, a search region used in image inpainting is restricted to a region which is determined to include an image most similar to an image to inpaint, and a similar image is searched for only within the restricted search region, so that it is possible to increase the probability of searching for an image most similar to an inpainting image region, and thus to provide a more natural image.

In addition, according to an embodiment of the present invention, it is possible to generate a desired inpainting image within a time period shorter than that required in image inpainting using a reduced search region.

While the invention has been shown and described with reference to certain embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An image inpainting apparatus using a restricted search region, the apparatus comprising:
    a target region setup unit for setting a target image region to be inpainted in response to an image inpainting request;
    a surrounding region setup unit for setting a surrounding image region which has a preset size and comprises the set target image region;
    a similar region division unit for setting a plurality of similar image regions by grouping similar pixels in the set surrounding image region, and dividing the surrounding image region into the plurality of set similar image regions;
    a search region setup unit for dividing the target image region according to the similar image regions, and setting a search region of each divided target image region; and
    an inpainting processing unit for detecting an image of an image region most similar to each divided target image region from the set search region of each divided target image region, and copying and pasting the detected image into each corresponding target image region.

2. The apparatus as claimed in claim 1, wherein the similar region division unit calculates edge values of pixels included in the set surrounding image region, calculates difference values of the calculated edge values between the pixels, compares the calculated difference values with a preset threshold value, and groups the pixels according to a result of the comparison to set resultant pixel groups as the similar image regions.

3. The apparatus as claimed in claim 2, wherein, when a calculated difference value is greater than or equal to the threshold value as a result of the comparison, the similar region division unit groups a plurality of pixels having a difference value, which is less than the threshold value, among the calculated difference values, and sets the grouped pixels as a similar image region.

4. The apparatus as claimed in claim 3, wherein the search region setup unit estimates division regions, into which the target image region is to be divided, based on pixels located in a position at which the plurality of set similar image regions and the target image region meet each other, divides the target image region into the estimated division regions, and sets a similar image region adjacent to each divided target image region as a search region of said each divided target image region.

5. An image inpainting method using a restricted search region, the method comprising the steps of:
    setting a target image region to be inpainted in response to an image inpainting request;
    setting a surrounding image region which has a preset size and comprises the set target image region;
    setting a plurality of similar image regions by grouping similar pixels in the set surrounding image region, and dividing the surrounding image region into the plurality of set similar image regions;
    dividing the target image region according to the similar image regions, and setting a search region of each divided target image region; and
    detecting an image of an image region most similar to each divided target image region from the set search region of each divided target image region, and copying and pasting the detected image into each corresponding target image region.

6. The method as claimed in claim 5, wherein dividing surrounding image region into the plurality of set similar image regions comprises:
    calculating edge values of pixels included in the set surrounding image region and calculating difference values of the calculated edge values between the pixels;
    comparing the calculated difference values with a preset threshold value; and
    grouping the pixels according to a result of the comparison and setting resultant pixel groups as the similar image regions.

7. The method as claimed in claim 6, wherein grouping the pixels according to a result of the comparison and setting resultant pixel groups as the similar image regions comprises, when a calculated difference value is greater than or equal to the threshold value, grouping a plurality of pixels having a difference value, which is less than the threshold value, among the calculated difference values, and setting the grouped pixels as a similar image region.

8. The method as claimed in claim 7, wherein setting the search region comprises:
    estimating division regions, into which the target image region is to be divided, based on pixels located in a position at which the plurality of set similar image regions and the target image region meet each other, and dividing the target image region into the estimated division regions; and
    setting a similar image region adjacent to each divided target image region as a search region of the each divided target image region.

9. A computer-readable recording medium having recorded thereon a program for executing the method of claim 5.

* * * * *